US011696589B2

(12) United States Patent
Cocchi et al.

(10) Patent No.: US 11,696,589 B2
(45) Date of Patent: Jul. 11, 2023

(54) SYSTEM FOR TREATING FOOD PRODUCTS AND CORRESPONDING METHOD

(71) Applicant: ALI GROUP S.R.L.—CARPIGIANI, Cernusco Sul Naviglio (IT)

(72) Inventors: Andrea Cocchi, Calderara di Reno (IT); Roberto Lazzarini, Reggio Emilia (IT); Cesare Stefanelli, Bologna (IT); Mauro Tortonesi, Ferrara (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 273 days.

(21) Appl. No.: 17/012,356

(22) Filed: Sep. 4, 2020

(65) Prior Publication Data

US 2021/0076702 A1    Mar. 18, 2021

(30) Foreign Application Priority Data

Sep. 13, 2019   (IT) .................... 102019000016301

(51) Int. Cl.
*H04L 12/00* (2006.01)
*A23G 9/28* (2006.01)
(Continued)

(52) U.S. Cl.
CPC .............. *A23G 9/28* (2013.01); *A23G 9/225* (2013.01); *G06F 16/182* (2019.01); *H04L 9/0643* (2013.01); *H04L 9/50* (2022.05)

(58) Field of Classification Search
CPC ........ G06Q 50/28; G06Q 10/04; G06Q 10/08; G06Q 50/04; A23G 9/28; A23G 9/225;
(Continued)

(56) References Cited

U.S. PATENT DOCUMENTS 5,819,735 A * 10/1998 Mansfield .............. G16H 40/67
                                                            600/300
7,975,931 B2   7/2011 Glielmo et al.
(Continued)

FOREIGN PATENT DOCUMENTS

EP     3360423 A1   8/2018
EP     3391752 A1   10/2018
(Continued)

OTHER PUBLICATIONS

Akitani et al., Shelf tag system with temperature controlling mechanism using battery-free rfid tag, May 10, 2007, pp. 1-6 (Year: 2007).*

(Continued)

*Primary Examiner* — Frantz Coby
(74) *Attorney, Agent, or Firm* — Shuttleworth & Ingersoll, PLC; Timothy J. Klima

(57) ABSTRACT

Described is a system for treating food products, the system comprising at least one machine comprising:
  a first container for treating a food product;
  at least one temperature sensor adapted to detect a temperature inside the container; and
  a processing and control unit, operatively connected to the at least one sensor to receive the temperature detected and comprising a module for receiving and transmitting at least the temperature detected.
The system also comprises a plurality of processing nodes defining an information write module configured to write to a distributed architecture database of the distributed ledger type information indicating at least the temperature received from the receiving and transmitting module.

11 Claims, 6 Drawing Sheets

(51) Int. Cl.
*G06F 16/182* (2019.01)
*A23G 9/22* (2006.01)
*H04L 9/06* (2006.01)
*H04L 9/00* (2022.01)

(58) Field of Classification Search
CPC ....... G06F 16/182; H04L 9/50; H04L 9/0643; Y02P 90/30
USPC ...................................... 62/68; 709/201, 217
See application file for complete search history.

(56) References Cited

U.S. PATENT DOCUMENTS

| | | | | |
|---|---|---|---|---|
| 8,851,365 | B2 * | 10/2014 | Minvielle | G01N 33/0001 235/383 |
| 9,069,340 | B2 * | 6/2015 | Minvielle | H05B 6/6435 |
| 9,436,170 | B2 * | 9/2016 | Minvielle | G06Q 10/06 |
| 9,564,064 | B2 * | 2/2017 | Minvielle | G06Q 30/06 |
| 10,207,859 | B2 * | 2/2019 | Minvielle | A23P 10/00 |
| 10,445,684 | B2 * | 10/2019 | Mehring | G06Q 10/06311 |
| 10,755,230 | B2 * | 8/2020 | Mehring | H04L 9/0637 |
| 2009/0058609 | A1 * | 3/2009 | Clayman | G06Q 20/20 340/10.1 |
| 2009/0303018 | A1 * | 12/2009 | Catteau | G09F 3/208 340/10.6 |
| 2012/0312049 | A1 | 12/2012 | Downs et al. | |
| 2019/0287102 | A1 * | 9/2019 | Cocchi | A23G 9/08 |
| 2019/0354992 | A1 * | 11/2019 | Duckett | G06Q 30/018 |

FOREIGN PATENT DOCUMENTS

| | | | | |
|---|---|---|---|---|
| JP | 2007111137 A | * | 5/2007 | ............. G06K 19/07 |
| KR | 20150105541 A | | 9/2015 | |
| WO | 2009034592 A1 | | 3/2009 | |

OTHER PUBLICATIONS

Italian Search Report dated Apr. 24, 2020 from counterpart Italian App No. 2019000016301.
European Office Action dated Mar. 2, 2022 from counterpart European Patent Application No. 20193806.5.

* cited by examiner

SYSTEM FOR TREATING FOOD PRODUCTS AND CORRESPONDING METHOD

This application claims priority to Italian Patent Application 102019000016301 filed Sep. 13, 2019, the entirety of which is incorporated by reference herein.

BACKGROUND OF THE INVENTION

This invention relates to a system for treating food products.

For example, the system for treating food products may comprise a system for making liquid or semi-liquid food products.

A need which is felt particularly strongly in the food industry is that of being able to guarantee food safety.

The food industry is subject to numerous rules and regulations aimed at ensuring compliance with processing standards to minimize the risks for end product consumers (for example, alteration of the product and/or its ingredients at any time during the storage/processing cycle).

This need is felt particularly strongly by machine end users, who demand that the processing and storage of their products be carried out in compliance with industry regulations and standards and that they be guaranteed even in the eventuality of legal disputes.

SUMMARY OF THE INVENTION

The aim of this invention is therefore to meet the above-mentioned need, in particular that of making available a system comprising a machine which, thanks to its features, can allow guaranteeing compliance with process standards to minimize the risks of alterations of food products.

BRIEF DESCRIPTION OF THE DRAWINGS

The technical features of the disclosure, with reference to the above aims, are clearly described in the annexed claims and its advantages are more apparent from the detailed description which follows, with reference to the accompanying drawings which illustrate example, non-limiting embodiments and in which:

DESCRIPTION OF THE PREFERRED EMBODIMENTS

This disclosure therefore refers to a machine 1 for treating food products. The machine 1 may comprise any machine for treating/processing food products; hereinafter, however, for simplicity and ease of understanding and without loss of generality, the machine 1 will be described as a machine adapted to treat liquid or semi-liquid products (thermally)—suitable, for example, to perform a thermal treatment such as pasteurization, or for making an ice cream product.

Figure 1:
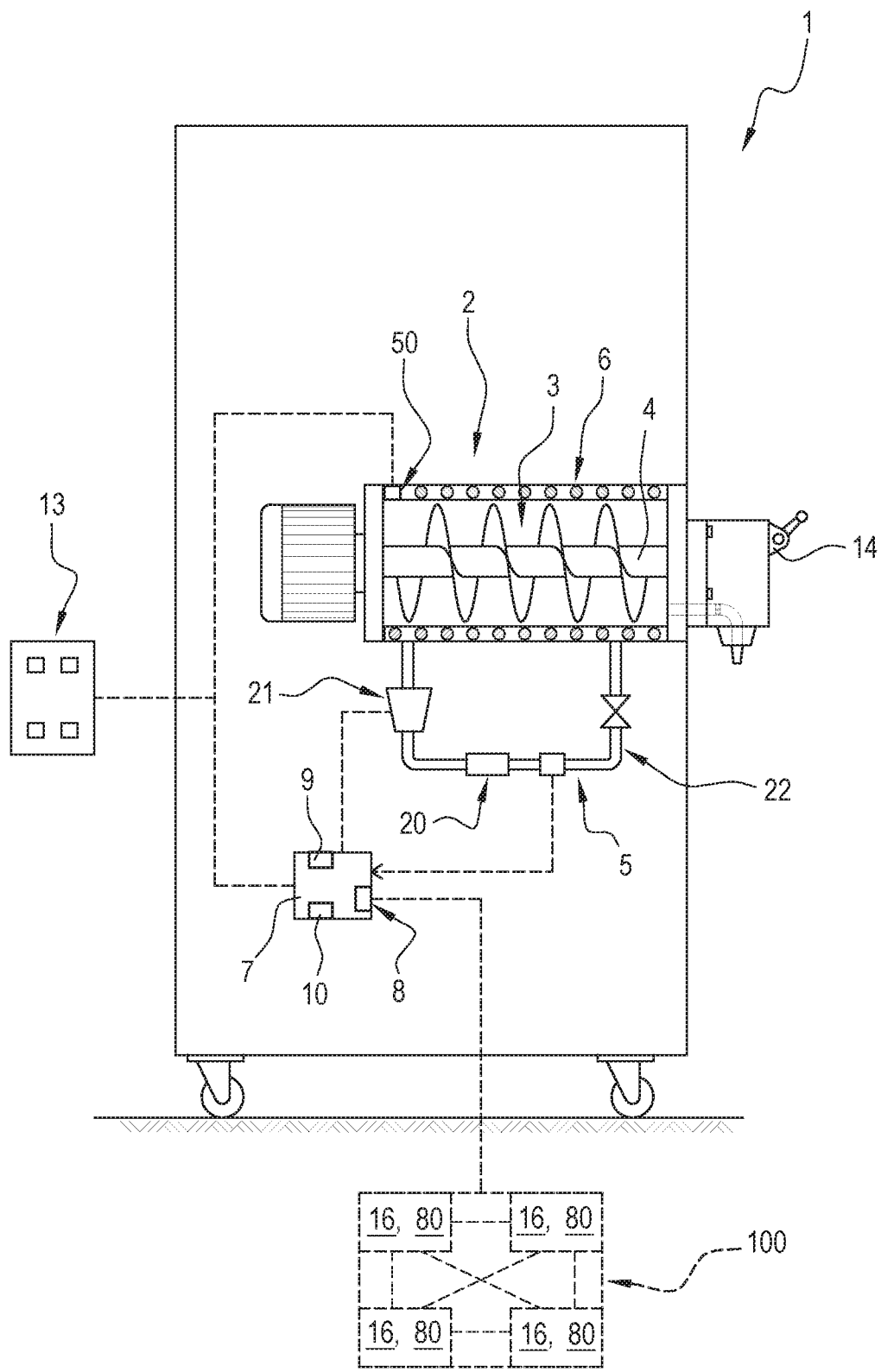
FIG. 1 is a schematic view of a first embodiment of a machine according to this invention.

The machine 1 for making liquid or semi-liquid products, illustrated in FIG. 1, is preferably adapted to make ice cream (artisan gelato or soft serve ice cream) or other products of the ice cream trade (granitas, sorbets, etc.), confectionery and the like (by way of non-limiting example; milkshakes, yogurts, frozen desserts, chilled dessert creams).

The machine 1 for making liquid or semi-liquid food products comprises:

a first treatment container 2 for treating a food product—for example, a first container 2 for processing a liquid or semi-liquid base product—and defining a processing chamber 3;

one or more temperature sensors 50 adapted to detect a temperature inside the container 2; and a processing and control unit 7, operatively connected to the one or more temperature sensors 50 to receive the temperature detected.

The processing unit 7 is preferably a HW element (or is defined by a plurality of interconnected HW elements).

The processing and control unit 7 also comprises a module 8 for receiving and transmitting data (coupled to the sensor 50) to transmit at least the temperature detected.

The module 8 for receiving and transmitting data preferably comprises a data communication interface.

Preferably, the module 8 for receiving and transmitting data is configured to connect to an internet network.

Preferably, the machine 1 comprises a stirrer 4 (preferably positioned inside the first container 2) for mixing the product contained in the first processing container 2.

Preferably, the machine 1 comprises a thermal system 5, comprising a heat exchanger 6 associated with the first processing container 2.

As illustrated in the accompanying figures, the machine 1 comprises a drive unit connected to the stirrer 4, for driving it in rotation.

Preferably, the drive unit is connected to the processing and control unit 7.

According to another aspect, the thermal system 5 comprises a heat exchanger 6 associated with the first processing container 2 (previously referred to), a further heat exchanger 20, a compressor 21, and a pressure reducing unit 22.

It should be noticed that the heat exchanger 6, the further heat exchanger 20, the compressor 21, and the pressure reducing unit 22 define a circuit containing a heat exchanger fluid.

In other words, the thermal system 5 is a thermodynamic system (configured to operate according to a thermodynamic cycle using a heat exchanger fluid).

The thermal system 5 is configured to cool and/or heat the product in the first container 2.

According to another aspect, the machine 1 comprises a user interface 13 comprising at least one user-activable control (preferably a plurality of controls) and connected to the processing and control unit 7. Preferably, the interface 13 comprises user-activable activation and selection controls and/or pushbuttons.

According to yet another aspect, the machine 1 comprises a dispenser 14. The dispenser is connected to the first processing container 2, which processes a liquid or semi-liquid base product, and allows the product to be extracted from the container 2.

The dispenser 14 preferably comprises a user-activable lever for allowing liquid or semi-liquid base product to be dispensed.

The machine 1 forms part of a system 100 for treating food products. In addition to the machine 1, the system comprises a plurality of processing nodes 16 defining an information write module 80 configured to write information, indicating at least the temperature received from the receiving and transmitting module 8, to a distributed architecture database DB of the distributed ledger type, as a function of data received from the receiving and transmitting module 8.

In fact, according to one aspect, the processing nodes are also storage nodes of the distributed architecture database DB of the distributed ledger type. Information received from the data receiving and transmitting module 8 can therefore be stored in the storage nodes of the distributed architecture database DB of the distributed ledger type.

According to another aspect, the distributed architecture database DB is of the blockchain ledger type and comprises information grouped in a plurality of interconnected blocks (B1, B2, Bn), each block of the plurality of blocks (B1, B2, Bn) being associated with a time stamp such that each temperature written to the database DB is certified by a time stamp.

According to an aspect of this invention, the distributed architecture database DB of the distributed ledger type may be a certified electronic register.

By "certified" (with reference to the electronic register) is meant that the data stored in the distributed architecture database DB of the distributed ledger type—for example, the temperature linked to the time stamp—are made secure by the database, so that it is impossible to make an unregistered and/or unapproved alteration or change to the data. That way, the information relating to the storage/processing of the products can be retrieved with the guarantee that each data item retrieved is identical to the data item originally stored, since the data cannot be modified after it has been saved to the database.

In this sense, the use of a distributed architecture database ensures transparency, reliability and security of the data stored in the database DB.

Preferably, the database DB is accessible at least partly to one or more between a manufacturer of the machine 1, a manufacturer of the food products for the machine 1 and/or an end user of the machine. In other words, the database DB may comprise information/data received by the receiving module 8 and which may be read at least partly by one or more of the aforementioned persons.

According to an aspect of this disclosure, the information write module 80 may be defined by a hardware and/or software element.

Preferably, the processing and control unit 7 can define a processing node (amongst a plurality of processing nodes) of a distributed architecture database DB of the distributed ledger type (preferably of the blockchain type). It should be noticed that, in that system, some (one or more) of the processing nodes may be defined by processing and control units 7 of machines 1 whilst others may be defined by computer processors (not belonging to the machines 1).

The processing and control unit 7 may be a unit of distributed type, that is to say, with distributed HW and SW elements, or it may be a single unit.

According to another aspect, the processing and control unit 7 may also define a processing (storage) node of a distributed architecture database DB of the "blockchain" type, comprising information grouped in a plurality of interconnected blocks B1, B2, . . . Bn.

Preferably, the blocks B1, B2, Bn are interconnected by cryptographic algorithms.

According to an aspect of this invention, the system 100 comprises a memory 10 (preferably in the processing and control unit 7 of the machine 1). The memory 10 contains a set of temperature intervals conforming to one or more standards according to Hazard Analysis and Critical Control Points (HACCP) procedures. The HACCP system comprises a set of procedures designed to monitor the storage and processing of food products which are subject to alteration and to the risk of contamination.

Described below is an aspect whereby the machine checks the products for correct processing and storage, with particular regard to the implementation to a fault reporting/alarm procedure.

The memory 10 may be a distributed HW memory or may be concentrated in a single electronic unit.

In one or more embodiments, the processing and control unit 7 may be optionally configured to extract one or more temperature intervals from the set of temperature intervals, chosen as a function of the state and settings of the machine for treating food products. For example, if the machine 1 is a machine for liquid or semi-liquid products, designed to perform a pasteurizing process, the memory 10 may comprise a temperature interval including temperatures at which thermal sterilization is effective. In addition or alternatively, if the machine 1 is a device for storing food products, the memory 10 may comprise a temperature interval including temperatures which can ensure correct storage.

Further, the processing and control unit 7 may be optionally configured to check whether the temperature received from the sensor/sensors 50 falls within the one or more intervals extracted and, if the temperature is outside the one or more intervals extracted, to generate an alarm message.

The alarm message may be transmitted to the user interface 13 and displayed on the user interface 13. In addition, or alternatively, the alarm message may be transmitted, together with the temperature detected, to the plurality of processing nodes 16.

According to an aspect of this invention, the machine 1 may optionally comprise a code reader (for example, a QR code reader or a barcode reader). The reader may be configured to scan a code associated with a food product placed in the machine 1. The module 8 of the processing and control unit 7 (coupled to the code reader) may be configured to transmit the information read by the code reader to the information write module 80 which is configured to write the information to the distributed database DB. It is thus possible to automatically store in the database DB information relating to the entry of a new product, associated with a certified time stamp.

According to one or more embodiments, the distributed architecture database DB of the distributed ledger type is defined by (built on) the Ethereum, Ethereum Classic, or Iota, or Eos, or NEO, or Waves, or Qtum, or NEM or Multiversum or R3 Corda or R3 Corda enterprise or Ripple or Stellar or Hyperledger platform (in any of the frameworks: Fabric, Burrow, Indy, Iroha, Sawtooth).

According to another aspect, the processing nodes comprise a first set of processors 16A, which are configured to keep a complete copy of the distributed architecture database DB, and a second set of processors 16B which are configured to keep a partial copy of the distributed architecture database DB.

In this way, advantageously, the processing nodes of the second set can be simpler than those of the first set and integrate a reduced capacity memory.

Preferably, each information block of the plurality of blocks B1, B2, Bn has a time stamp associated with it.

According to one aspect, the processing nodes are configured to define nodes of a distributed architecture database operating with a (consensus) protocol which is one of the following types:

proof of work;
proof of stake;
Corda consensus protocols (configured to reach consensus on the specific "state object");
CFT (Crash fault tolerant), preferably implemented with Kafka and/or Zookeeper; Solo;
BFT (Byzantine fault tolerance);
PBFT (practical BFT);
SBFT (simplified BFT); Raft;
Sumeragi;
PoET (proof of Elapsed Time);
Permissioned Voting-based.

Preferably, the information blocks B1, B2, Bn are interconnected by cryptographic algorithms.

FIG. 1 shows a machine for food products, preferably for ice cream (artisan gelato or soft-serve ice cream).

Figure 2:
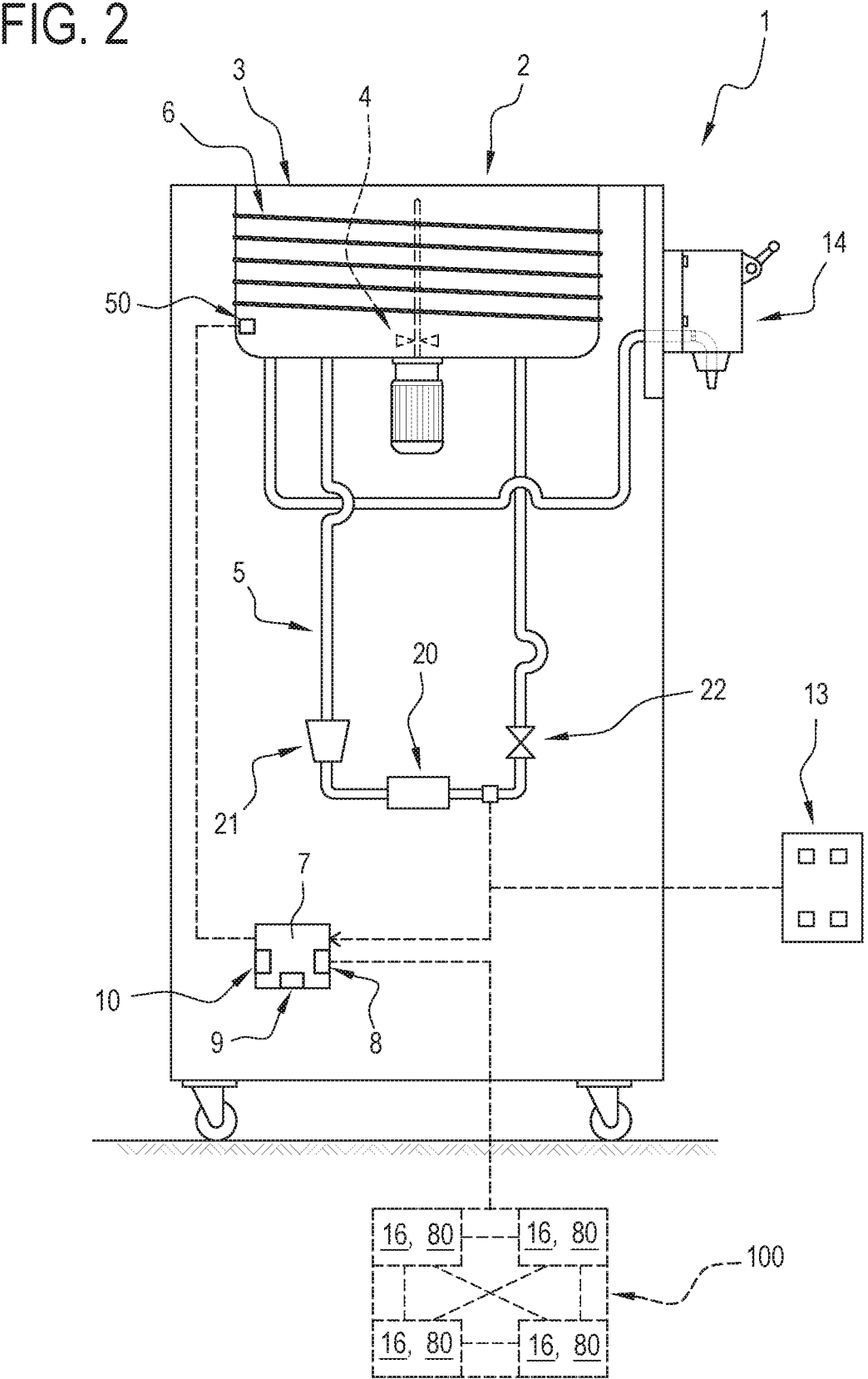
FIG. 2 is a schematic view of a second embodiment of a machine according to this invention.

FIG. 2 shows a machine configured to (thermally) treat liquid or semi-liquid products, in particular configured to allow pasteurization to be carried out.

Figure 3:
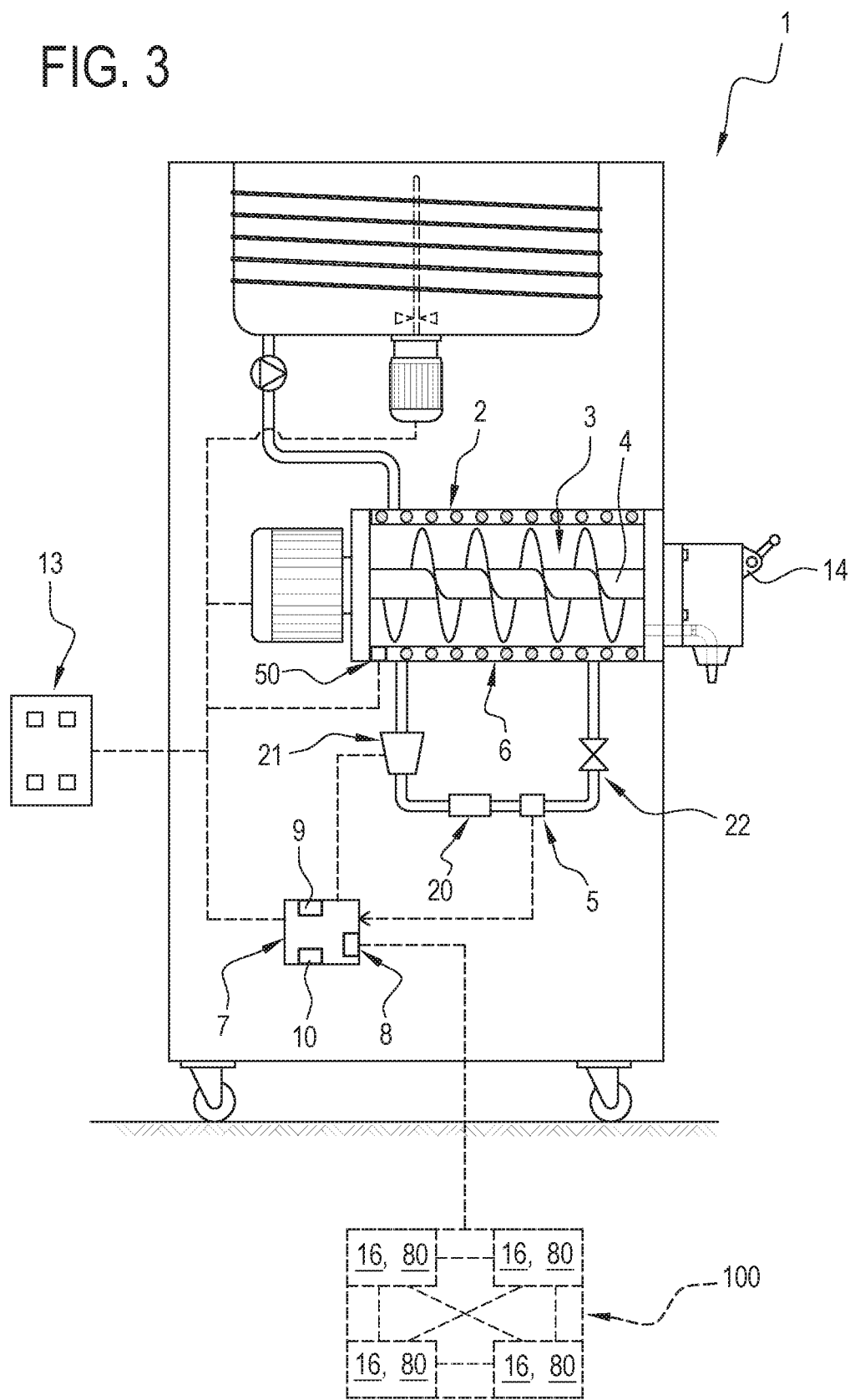
FIG. 3 is a schematic view of a third embodiment of a machine according to this invention.

FIG. 3 shows a machine which is preferably for ice cream (artisan gelato or soft-serve ice cream) and which is equipped with an upper thermal treatment (pasteurization) tank.

Figure 4:
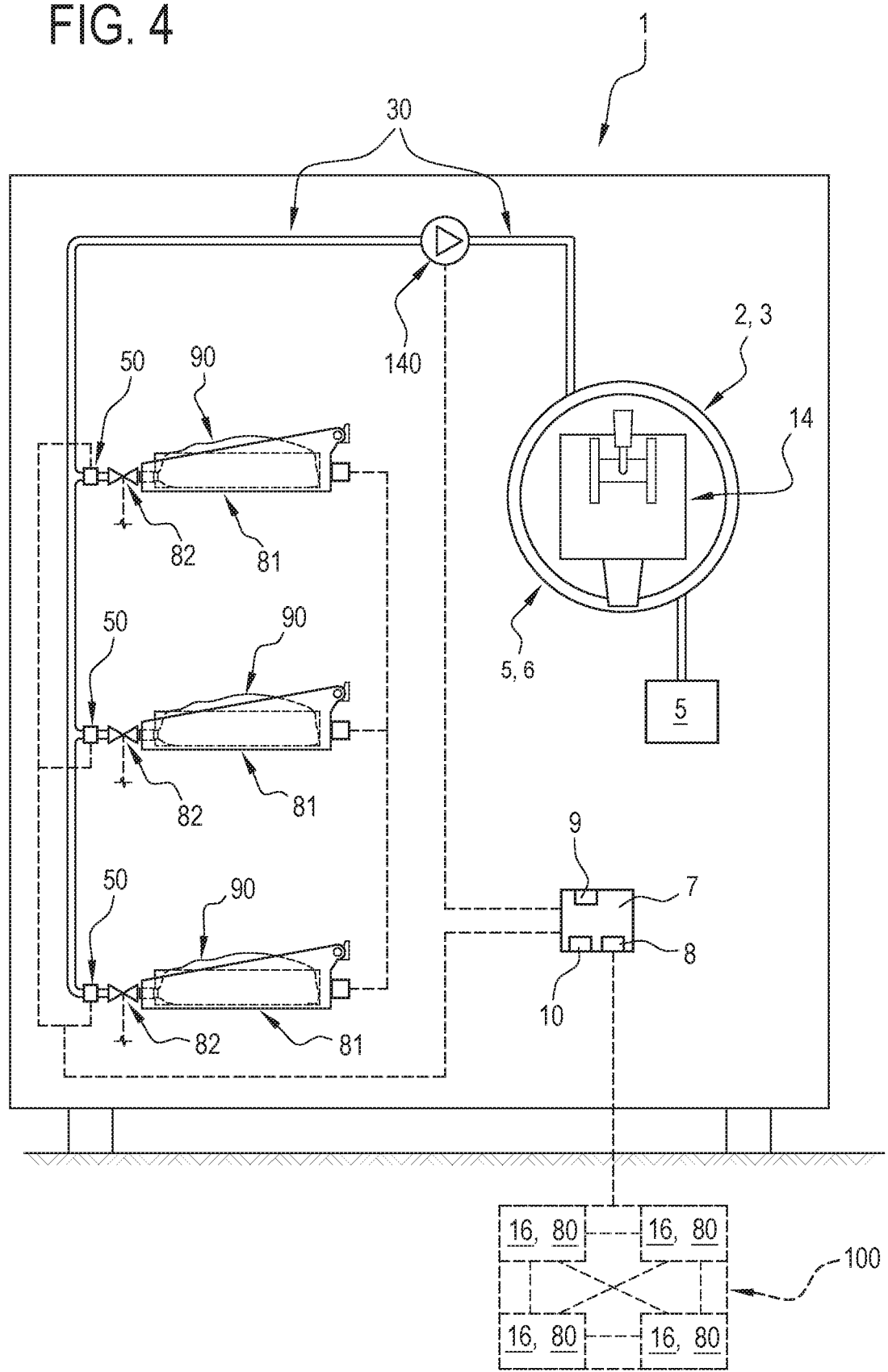
FIG. 4 is a schematic view of a fourth embodiment of a machine according to this invention.

With reference in particular to FIG. 4, it should be noticed that the presence of at least one further container 90, configured to feed the base product to the first container 2, is contemplated.

The further container 90 is connected to the first container 2 by means of a pipe 30.

Preferably, the at least one further container 90 is a flexible or deformable container ("bag").

Preferably, according to one aspect, there is a pump 140 configured to allow transferring the base product between the further container 90 and the first container 2.

The pump 40 is preferably connected to the control unit 7.

According to further embodiments, the further container 90 is a bag-in-box type container.

Preferably, the further container 90 is supported by a supporting element 81.

Preferably, the machine 1 according to the embodiment in FIG. 4 comprises a plurality of containers 90, which can alternatively and selectively be connected to the first container 2.

Specifically, it should be noticed that associated with each container 90 there is a valve 82, configured to be switched between a closed configuration and an open configuration. In the open configuration, the valve allows base product to be drawn from the container 90 with which it is associated.

Even in that embodiment, product processing is carried out in the container 2.

Figure 5:
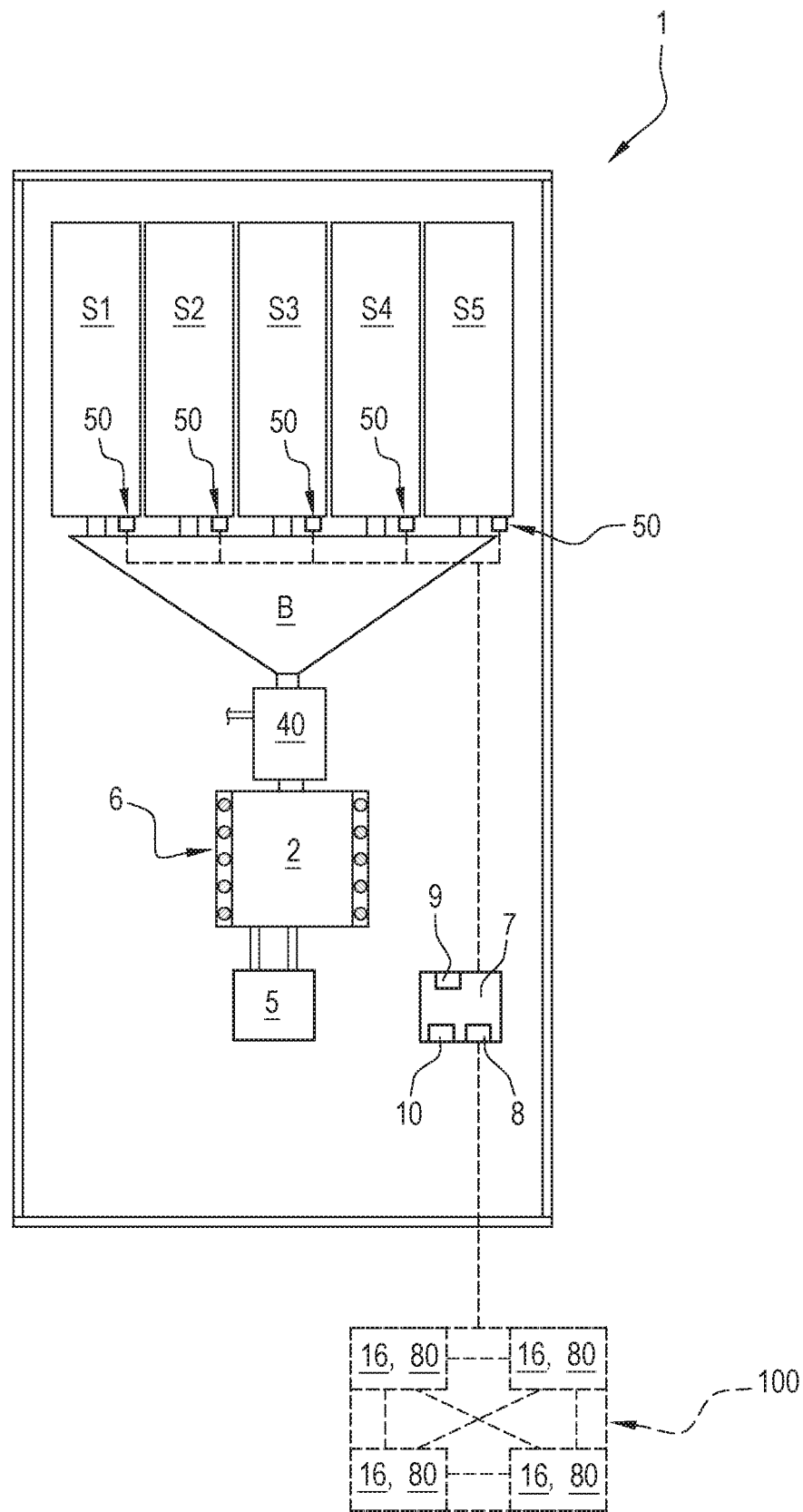
FIG. 5 is a schematic view of a fifth embodiment of a machine according to this invention.
Figure 6:
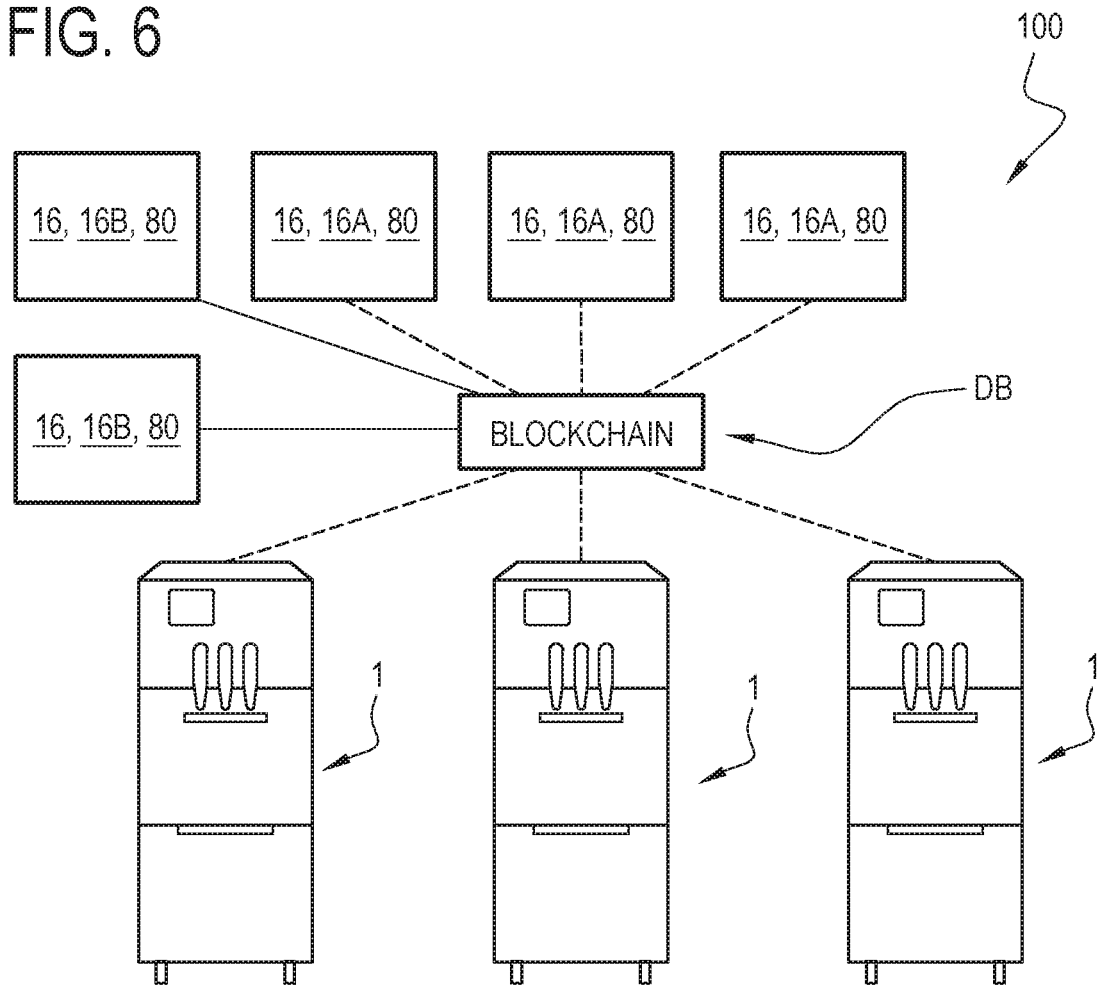
FIG. 6 is a schematic view of a system of machines according to this invention.
Figure 7:
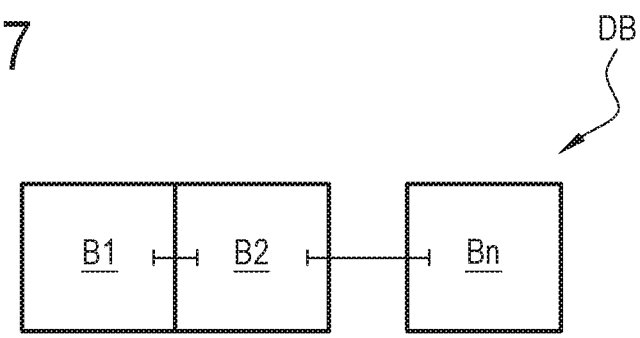
FIG. 7 is a schematic view of a distributed architecture database of the blockchain type.

Specifically with reference to FIG. 5, notice that said figure shows a plurality of feed containers S1, S2, S3, S4, S5 for feeding base products to the processing container 2. Preferably, the base products are powdered products.

It should be noticed that, preferably, the machine 1 comprises a collector B which is connected to the processing container 2.

Optionally, the machine 1 may comprise a mixing chamber 40 interposed between the first container 2 and the feed containers S1, S2, S3, S4, S5.

In the mixing chamber 40, a diluting liquid is preferably added to the powder extracted from the feed containers S1, S2, S3, S4, S5.

Preferably, the remote server 101 also comprises a data processing unit 102.

Preferably, that data processing unit 102 processes summary data (monthly, weekly or, more generally, at predetermined intervals) based on the information present in the database DB.

Preferably, the system 100 comprises a (web) user interface INT.

Preferably, the (web) user interface INT is made available by means of a suitably configured remote server 101.

The user interface INT is preferably configured to query the database DB, and to present raw data and/or summary data extracted from the same database DB.

Preferably, the user interface INT may be used by one or more of the actors involved in use of the system 100: suppliers F1, F2, F3, client Cl, machine manufacturer PR, etc.

Preferably, the user interface INT may comprise a system with different access levels, one associated with each actor in the system: suppliers F1, F2, F3, client Cl, machine manufacturer PR, etc.

Preferably, each access level corresponds to the visibility, through the user interface INT, of a predetermined data set.

Preferably, the processing nodes 16 are defined by processors which are external relative to the machine 1.

Therefore, preferably, the processing nodes 16 are defined by remote (virtual) processors relative to the one or more machines of which the production system is composed.

According to another aspect, the database DB is resident in one or more remote servers (remote from the machine 1) and the machine 1 comprises only the module 8 for receiving and transmitting data, which is configured to transmit data captured by the temperature sensor 50 to an information write module 80 in a distributed architecture database DB of the distributed ledger type.

In use, the machine 1 is equipped with SW configured to write/read data to and/or from the distributed architecture database DB of the distributed ledger type resident on one or more remote servers which are external relative to the machine.

In contrast, the database DB is entirely resident on one or more remote servers (relative to the machine 1).

According to another aspect, the module 80 for writing information to a distributed architecture database DB of the distributed ledger type may be part of the machine 1.

In one or more embodiments, the invention relates to a method for controlling the treatment of food products in a system 100 for treating food products. The method comprises:

providing at least one system according to any of the embodiments described;
detecting a temperature inside the container 2 by means of a temperature sensor 50;
through the receiving and transmitting module 8, transmitting to a plurality of processing nodes 16 and/or storing at least the temperature detected; and writing, through the plurality of processing nodes (16), and/or storing, information indicating at least the temperature received from the receiving and transmitting module 8 to a distributed architecture database DB of the distributed ledger type.

According to an aspect of the invention, the method may comprise the following steps:

providing a memory 10 containing a set of temperature intervals conforming to one or more standards according to HACCP procedures—for example, temperature intervals which make it easier to guarantee correct and safe treatment of products which risk being biologically contaminated, extracting one or more temperature intervals from the set of temperature intervals, chosen as a function of the state and settings (for example, the type of action performed on the food products) of the machine for treating food products, checking whether the temperature received falls within the one or more intervals extracted, and if the temperature is outside the one or more intervals extracted, generating an alarm message.

According to an aspect of this disclosure, the method may further comprise the step of transmitting the alarm message, together with the temperature, to the plurality of processing nodes 16.

In one or more embodiments, the data stored in the distributed architecture database DB of the distributed ledger type may be collected in a report. The report may contain a plurality of data and information items, indicating at least the temperature, written to the distributed architecture database DB of the distributed ledger type. Preferably, the report may also comprise the summary data processed by the processing unit 102.

In other words, the report may comprise information regarding the temperatures detected by the temperature sensor 50 together with a corresponding time stamp that certifies the date and time at which the temperatures were detected.

According to another aspect, the distributed architecture database DB of the distributed ledger type may contain one or more of the following pieces of information:

the number of operations for refilling the processing container 2 with base mixture;

alarm signals generated by the processing and control unit 7;

data relating to a code (e.g.: QR code, bar code, etc.) present on a feed container containing the base ingredients (and scanned, for example, by a code reader which is part of the machine);

the time (hour, day, etc.) at which the refilling operation and/or the code scanning occurred and/or the alarm signal was generated.

The time stamp—that is, the date and time associated with the data stored in the database—may be a time instant of the machine state (expressed in machine time: that is to say, the machine time setting).

Besides the information regarding the temperatures detected, the report may comprise information regarding any one of the information items stored in the distributed architecture database DB of the distributed ledger type together with the corresponding time stamp.

The data processing unit 102 may be configured to generate periodically (daily, weekly, monthly, etc.) and automatically the report comprising the information relating to the temperatures detected.

In one or more embodiments, the report generated is an HACCP report: that is, a report comprising information to check whether the treatment to which the food products are subjected by the machine 1 conform to HACCP protocols.

According to an aspect of this disclosure, the report may comprise an HACCP table obtained from the data relating to the food product treatment performed by the machine 1. Each item in the table may comprise:

a temperature detected by the sensor 50,
a time stamp for each operation,
optionally, an alarm signal, if generated, and
optionally, an information item indicating which machine operation or program is being used (for example, in the case of pasteurization, which step in the pasteurization cycle is in progress, between heating, pause and cooling).

The report may also comprise graphs and/or statistics and/or worksheets reconstructed as a function of the items in the table.

The data listed may be transmitted by the module 8 to the plurality of nodes 16 and written to the database DB.

Advantageously, the production system 100 allows storing in a particularly secure and reliable manner at least the information received from the machine 1 together with a time stamp.

Advantageously, in addition to the information from the sensors with time stamp, the production system 100 allows storing any alarm signals and/or information relating to a program run by the machine 1, together with a corresponding time stamp.

Advantageously, thanks to the system of this disclosure, it is possible to ensure, even for the purposes of legal disputes, that the product has been processed/stored in accordance with current industry standards, since there is a database comprising temperature data guaranteed by a certified time stamp.

Advantageously, the report thus generated can contain temperature data and, in general, food product management data, which are ready for submission to a local health authority.

What is claimed is:

1. A system for monitoring processing of a food product, comprising:
   a machine comprising:
      a first container configured for receiving and processing a liquid or semi-liquid base product into the food product;
      a stirrer positioned inside the first container for mixing the food product contained in the first container;
      a thermal system comprising a heat exchanger thermally connected with the first container, a further heat exchanger, a compressor, and a pressure reducing unit;
      a drive unit connected to the stirrer and configured for rotatably driving the stirrer;
      a dispenser connected to the first container and configured to allow the food product to be extracted from the first container;
      a temperature sensor adapted to detect a temperature inside the first container;
      a processing and control unit, operatively connected to the temperature sensor to receive the detected temperature and comprising a receiving and transmitting module for receiving and transmitting the detected temperature;
      a user interface comprising a user-activable control and connected to the processing and control unit, the user interface comprising at least one chosen from user-activable activation and selection controls, and push-buttons;
   a plurality of processing nodes defining an information write module configured to write information to a distributed ledger architecture database, the information indicating the detected temperature received from the receiving and transmitting module;

a memory containing data which indicates a set of temperature intervals conforming to one or more standards according to HACCP procedures;

wherein the processing and control unit is configured to extract one or more temperature intervals from the set of temperature intervals, chosen as a function of a state and settings of the machine, and to check whether the detected temperature received from the temperature sensor falls within the one or more intervals extracted, and, if the detected temperature is outside the one or more intervals extracted, to generate an alarm message.

2. The system according to claim 1, wherein the distributed ledger architecture database is a blockchain ledger architecture database and comprises information grouped in a plurality of interconnected blocks, each block of the plurality of interconnected blocks being associated with a respective time stamp such that each detected temperature written to the blockchain ledger architecture database is certified by the respective time stamp.

3. The system according to claim 1, wherein the distributed ledger architecture database is a certified electronic register.

4. The system according to claim 1, wherein the distributed ledger architecture database is accessible at least partly to at least one chosen from a manufacturer of the machine, a manufacturer of the base product for the machine and an end user of the machine.

5. The system according to claim 1, wherein the processing and control unit defines one of the processing nodes.

6. The system according to claim 2, wherein the interconnected blocks are interconnected by cryptographic algorithms.

7. The system according to claim 1, wherein the distributed ledger architecture database is configured on an Ethereum platform: Ethereum Classic, or Iota, or Eos, or NEO, or Waves, or Qtum, or NEM, or Multiversum or R3 Corda or R3 Corda enterprise or Hyperledger or Ripple or Stellar.

8. The system according to claim 1, wherein the processing nodes comprise a first set of processors which are configured to keep a complete copy of the distributed ledger architecture database, and a second set of processors which are configured to keep a partial copy of the distributed ledger architecture database.

9. The system according to claim 1, wherein the processing nodes are configured to define the processing nodes of the distributed ledger architecture database operating with a consensus protocol to enable writing to the distributed ledger architecture database which is selected from the following types:
proof of work;
proof of stake;
Corda consensus protocols (configured to reach consensus on the specific "state object");
CFT (Crash fault tolerant), preferably implemented with Kafka and/or Zookeeper;
Solo;
BFT (byzantine Fault Tolerance);
PBFT (practical BFT);
SBFT (simplified BFT);
Raft;
Sumeragi;
PoET (proof of Elapsed Time);
Permissioned Voting-based.

10. A method for controlling processing of a food product, comprising the following steps:
providing:
a machine comprising:
a first container configured for receiving and processing a liquid or semi-liquid base product into the food product;
a stirrer positioned inside the first container for mixing the food product contained in the first container;
a thermal system comprising a heat exchanger thermally connected with the first container, a further heat exchanger, a compressor, and a pressure reducing unit;
a drive unit connected to the stirrer and configured for rotatably driving the stirrer;
a dispenser connected to the first container and configured to allow the food product to be extracted from the first container;
a temperature sensor adapted to detect a temperature inside the first container;
a processing and control unit, operatively connected to the temperature sensor to receive the detected temperature and comprising a receiving and transmitting module for receiving and transmitting the detected temperature;
a user interface comprising a user-activable control and connected to the processing and control unit, the user interface comprising at least one chosen from user-activable activation and selection controls, and pushbuttons;
a plurality of processing nodes defining an information write module configured to write information to a distributed ledger architecture database, the information indicating the detected temperature received from the receiving and transmitting module;
a memory containing data which indicates a set of temperature intervals conforming to one or more standards according to HACCP procedures;
wherein the processing and control unit is configured to extract one or more temperature intervals from the set of temperature intervals, chosen as a function of a state and settings of the machine, and to check whether the detected temperature received from the temperature sensor falls within the one or more intervals extracted, and, if the detected temperature is outside the one or more intervals extracted, to generate an alarm message;
detecting the detected temperature inside the first container with the temperature sensor;
transmitting, through the receiving and transmitting module, the detected temperature; and
writing, through the plurality of processing nodes, the detected temperature received from the receiving and transmitting module to the distributed ledger architecture database.

11. The method according to claim 10, and further comprising transmitting the alarm message, together with the detected temperature, to the plurality of processing nodes.

* * * * *